United States Patent [19]

Koerber

[11] Patent Number: 5,557,793

[45] Date of Patent: Sep. 17, 1996

[54] IN AN OBJECT ORIENTED REPOSITORY, A METHOD FOR TREATING A GROUP OF OBJECTS AS A SINGLE OBJECT DURING EXECUTION OF AN OPERATION

[75] Inventor: Paul D. Koerber, Mission Viejo, Calif.

[73] Assignee: Unisys Corporation, Blue Bell, Pa.

[21] Appl. No.: 381,574

[22] Filed: Jan. 31, 1995

[51] Int. Cl.$^6$ .................................................. G06F 13/00
[52] U.S. Cl. .................. 395/600; 395/800; 395/650;
364/222.81; 364/DIG. 1; 364/285.1; 364/962.1;
364/DIG. 2
[58] Field of Search .................................. 395/600, 575,
395/650, 425

[56] References Cited

U.S. PATENT DOCUMENTS

| | | | |
|---|---|---|---|
| 5,355,477 | 10/1994 | Strickland et al. | 395/600 |
| 5,386,559 | 1/1995 | Eisenber et al. | 395/600 |

OTHER PUBLICATIONS

Wu et al., "Dynamic finite versioning: an effective versioning approach to concurrent transaction and query processing.", IEEE, 1993, pp. 577–586.

Morzy, "The correctness of concurrency control for multi-version database system with limited number of version.", IEEE, 1993, pp. 595–604.

*Primary Examiner*—Thomas G. Black
*Assistant Examiner*—C. Pham
*Attorney, Agent, or Firm*—J. Ronald Richebourg; Mark T. Starr; Robert R. Axenfeld

[57] ABSTRACT

In a computer system having a user interface, a memory and a database, a repository program operating in the computer system for accessing the database, the repository program executing a method for treating a group of objects as a single object. This method comprises the steps of retrieving a collection of references for a type from the repository; sorting out each reference in the collection of references that are composite references and have a versioned object type; for each sorted reference, retrieving objects from the reference; and calling up current operations for each retrieved object.

4 Claims, 6 Drawing Sheets

IN AN OBJECT ORIENTED REPOSITORY, A METHOD FOR TREATING A GROUP OF OBJECTS AS A SINGLE OBJECT DURING EXECUTION OF AN OPERATION

FIELD OF THE INVENTION

The present invention relates in general to the field of repository databases and in particular to a method for treating a group of objects as a single object in such repositories.

BACKGROUND OF THE INVENTION

The storage and manipulation of data records or objects within a database application is well known in the prior art. A database allows one to store information in it; and it does not necessarily have any special meaning associated with the things that are stored in the database. A repository not only uses the database as a data store, but it is a layer above a database. A repository has information about the things stored in the database. Stated otherwise, a repository is like a card catalog that is found in the library, with the library being analogous to a database.

With the advent of repositories, improvements in the accessibility of data within databases has improved. However, as these repositories have become larger and more complex a method is required to treat a group of related objects as a single object for repository services.

BRIEF SUMMARY OF THE INVENTION

It is therefore an object of the present invention to provide an improved repository system.

It is another object of the present invention to provide an improved repository which supports a composite object service.

The method of the present invention is useful in a computer system having a user interface, a memory and a database. More specifically, the method of this invention is a program executed by such a computer system for treating a group of objects as a single object.

DETAILED DESCRIPTION

Before proceeding with a detailed description of the method of the present invention a background discussion of repositories in which the present invention is useful would be helpful. In general, a repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information describes who can use definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules.

Figure 1:
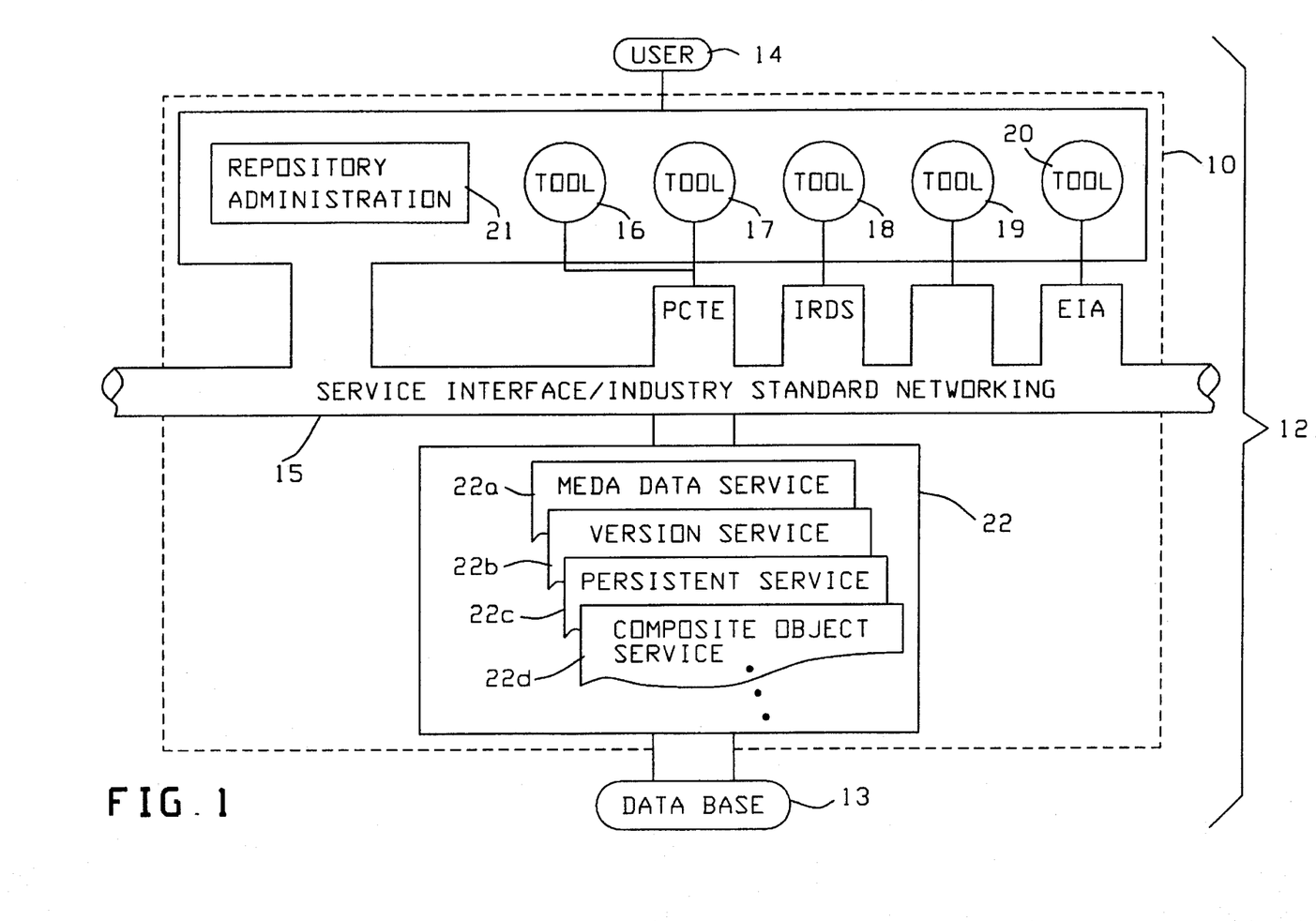
FIG. 1 is a block diagram of a computer system showing the various components of hardware and software that support a repository employing the method of the present invention.

Referring now to the drawings and FIG. 1 in particular, a block diagram is shown of a computer system including a repository 10 that may use the method of the present invention. The repository 10 is illustrated as being supported by an information system 12 having a user interface 14. Tools 16–20 (such as CASE tools), which are integrated within the repository 10, are coupled to a services interface 15. The tools 16 and 17 are coupled to the interface 15 by means of an interface agent identified as Portable Common Tool Environment ("PCTE"), tool 18 is coupled to the interface 15 by means of an information Resource Dictionary System ("IRDS") and tool 20 is coupled to the interface by means of an Electronic Industry Associates ("EIA") interface agent. The point here is to illustrate the flexibility of use of a variety of tools and interface agents with the repository 10.

An administrator 21 manages the repository 10, the database 13 and the environment around the repository. The administrator 21 is typically a work station that can manage a single repository or a network of repositories.

A service library 22 provides the functionality that enables the user to store, manage and reuse repository information. Examples of services within the library 22 are MetaData Service 22a, which is disclosed in a copending patent application Ser. No. 08/382,203 assigned to the assignee of this application and entitled A METHOD FOR SUPPORTING OBJECT MODELING IN A REPOSITORY; and Version Service 22b, which is disclosed in a copending patent application Ser. No. 08/381,580 also assigned to the assignee of this application and entitled A METHOD FOR MAINTAINING A HISTORY OF SYSTEM DATA AND PROCESSES FOR AN ENTERPRISE. Another library service, Persistent Service 22c, deals with definition, tracking and maintenance of objects that continue to exist beyond the execution of a particular tool or of the repository itself. Yet another library service, Composite Object Service 22d, is the subject of this patent application. It is noted that many more types of library services may form a part of such a repository, the details of which are beyond the scope of this disclosure.

The repository employing the present invention provides a client/server architecture in which clients, i.e. tools 16–20, request services form the server, i.e. the repository 10 and its service library 22. In return, the repository and its service library 22 respond to requests from client tools 16–20. A repository client is software that accesses or modifies information that is maintained by the repository. The repository client uses the service library 22 (i.e., the server), which includes software integrated into the repository to manage repository information and provide services to users of that information. It is noted that software in the repository can act both as a repository client when the software is requesting a service from some other repository software and as a repository server when the software is providing a service to some other repository software.

It is pointed out that a SPARC system manufactured by Sun Microsystems, Inc. of Mountain View, California, was used for executing one embodiment of the method of the present invention, which method was written in C++ programing language.

As a repository user, one can access the information in the repository through the tools 16–20 that have been integrated within the repository. In the context of a repository, a "tool" is any application software that creates, modifies or uses information in the repository. Tools primarily use the repository for sharing information with other tools and tool users. For example, a COBOL compiler and a user-interface tool can share the definition of a data structure. Tools also benefit from using the repository services that provide features such as a version control and network distribution. A wide variety of tools serving many diverse purposes can use a repository. A catalog of such tools includes integrated computer-aided software engineering (CASE) and fourth generation language (4GL) tools, enterprise modeling tools, analysis and design specification tools, project planning tools, word processors, graphics tools, source code editors, compilers, linkers, debuggers, etc.

The method of the present invention, or the composite object service 22d, enables the user to store a complex structure in the repository. For example, to store a complex program in the repository the user might define one type to represent the program as a whole, one type to represent the code modules, and another type to represent the data files. The user then stores the actual code modules and data files as instances of these types. The program object is the composite object that links the modules and files to represent the unified program. The composite object service gives the user the ability to maintain and modify the component objects as a single entity.

Changes made to objects over time may be recorded so as to maintain information about the previous states of these objects. In other words, version information provides a history of the systems, data and processes for an information system. This is performed by the Version Service 22b disclosed in the above-cited co-pending patent application.

At this juncture of the description several definitions would be helpful.

Types

A type is a template that describes a set of features—the state and behavior—that an object or another type can possess. A type defines a pattern that can be used to create or identify objects; it does not contain the actual object. A model is defined by a hierarchy of types.

Most types define the structure of repository objects as the features the objects can have. Data types define the values associated with the features. (Data types are also known as primitive types.) For example, data types are used to define attribute values, operation parameters, and operation return values. The values represented by the data types do not exist as separate objects in the repository. Instead, they are always sorted as part of a repository object.

Persistent types define objects that continue to exist within the repository beyond the execution of a particular tool or of the repository. These persistent objects are essentially permanent—they remain in the repository until they are explicitly deleted by users. The majority of repository types are persistent.

A transient type defines a temporary object that will be automatically deleted when the function or program in which the object was created exists or terminates. Transient types are provided in the model to support exchange of data between an application and the repository.

A type that can be used to define other types and objects is said to be instantiable. Objects derived from a type are called instances of that type. Types derived from a type are called subtypes of that type. Instances and subtypes of a type inherit the features—attributes, references, and operations—defined for that type. The repository User type is an example of an instantiable type. A type that is used to define only other types and not objects is said to be abstract.

A type that is derived from one or more other types is called a subtype. The definition of a subtype identifies the type or types from which it is derived. A type from which a subtype is derived is called the supertype. The definition of a supertype identifies the subtypes derived from it. A type cannot be a supertype or a subtype of itself. A subtype inherits all the features of its supertype. It can be customized by adding new features. The structure created by deriving types from other types is called a hierarchy. The hierarchy shows the relationship of the supertypes and subtypes. A hierarchy has a single base type. The base type is the highest supertype in the hierarchy.

In addition to features defined specifically for a subtype, each subtype acquires the features defined for the supertype. This trait is called inheritance. For example, managers have all of the features defined in Manager, and they inherit all of the features of Employee as well. Hence, if the Employee type has a feature such as name, we can ask for the name of a manager since Manager is a subtype of Employee.

Features

A feature defines some element of either the state or the behavior that objects can possess. A feature is defined for a type, but applied to the corresponding objects. The repository has two kinds of features: operations and properties. For example, the Employee type might define the features name, birthDate, salary, and setSalary. Each employee object is subsequently considered to possess these features. That is, each employee has a name, a birth date, and salary. The employee's salary can be modified by using the setSalary feature.

There are two basic categories of features: properties and operations. Properties define state. For example, the salary feature is a property that defines an employee's current salary. Operations define behavior. For example, the setSalary feature is an operation that defines the mechanism for changing an employee's salary.

Properties

A property is a feature that represents a state that objects can possess. (In some models, properties are called instance variables.) A property can represent either a single value or a set of values. Properties are further divided into attributes, whose values are embedded within the owning objects, and references, whose values are independent objects.

The repository supports the following kinds of properties:

Attribute

A property for which the value is embedded within the owning object. For example, an employee's social security number can be defined as an attribute whose value is stored as a string within the employee object.

Reference

A property for which the value is maintained outside the owning object. For example, the employee's manager can be defined as a reference that identifies a separate employee object that represents the manager.

Every property has a domain that identifies the objects that the value of the property can hold. The domain is defined as a type. Objects that are instances of the type are legal values for the property. For example, the domain of the boss property of the Employee type might be specified as the Manager type. Therefore, only a manager object can be designated as the boss of an employee.

When an object is first created, none of its properties have values until they are implicitly assigned a default value or explicitly assigned a value by the construct operation. Until a property has a value it is considered undefined. For properties that are references, the value is considered null. The state of being null is not a value itself. Rather, it means that no value exists.

A property for which the value is embedded within the owning object is called an attribute. Such a property typically is used for simple values that are not shared between multiple owning objects. For example, the Employee property birthDate is simply a Date object—that is, the domain of the birthDate property is the Date type. If one employee's birthDate property is changed, the change does not affect other employees whose birthDate property is the same date. Consequently, each employee object should use a "private" date object that is embedded within it—that is, as an attribute.

A property for which the value is maintained outside the owning object is called a reference. For a reference, the owning object points to the value object. One reason for defining a property as a reference is to allow object sharing. A reference enables two or more owning objects to have the same value for a property. All owning objects can point to the same value object. For example, if two employees have the same manager as a boss, they share the same manager object. Consequently, any changes to the manager (such as changing his or her name) are reflected when the boss reference is accessed for all employees that have that boss.

A property that has one value for each object is said to be single valued. For example, each employee has one name and one birth date. A property that has more than one value for each object is said to be multi-valued. For example, each manager manages multiple employees, so the staff property for a manager object must be able to reference multiple values. A multi-valued property is defined by specifying a collection as its domain. A collection represents a set of values. A collection provides the ability to count the values defined for a multi-valued property, to add new values to the property, and to delete existing values.

The repository supports several types of collections, each of which organizes elements in a different manner. This capability enables the user to:

Store and retrieve the elements in a special order; and,

Search for elements in a special way.

The collection types supported by the repository are summarized in the following table:

| Type  | Description |
| --- | --- |
| Array | Creates a dynamic array of objects in which an integer index can be used to access array members. An array can contain duplicate objects. |
| List  | Creates an ordered collection of objects. A list can contain duplicate objects. |
| Set   | Creates an unordered collection of objects. Objects in a set must be unique. |

Operations

An operation is a feature that represents a behavior that objects can possess. An operation can be thought of as a function: it has a name, an optional set of parameters, and an optional return type. Like properties, operations are applied to each object within the owning type. Consequently, an operation is generally invoked in the context of a specific object.

An operation can have parameters that identify information a caller must provide when invoking the operation. If an operation has no parameters, a caller merely invokes the operation for the desired object. For example, consider the following features:

| Type | Feature | Domain/Return Type |
| --- | --- | --- |
| Employee | birthDate (attribute) | Date |
|          | age (operation)       | Integer |

As shown, the birthDate attribute has a domain of Date. Age is an operation (with no parameters) whose return type is Integer. The purpose of age is to compute an employee's current age (in years) from his or her birth date. Because the age operation is invoked for a specific employee, it is able to obtain the value of that employee's birthDate attribute, make the necessary computation, and return the appropriate integer without requiring parameters.

When an operation has parameters, each parameter has semantics similar to those of properties. Each parameter has a name, a domain type, and a set of options that can be used to affect the behavior of the parameter. The following table shows an example of an operation, defined for the Employee type, that has parameters:

| Operation | Parameter | Parameter Domain | Parameter Options |
| --- | --- | --- | --- |
| setSalary | amount | Real | REQUIRED |
|           | authorizedBy | Manager | REQUIRED |
|           | effective | Date | DEFAULT today's date |

The setSalary operation has three parameters:

The amount parameter is a Real number (floating-point) that is required. Therefore, the caller must specify a value for this parameter.

The authorizedBy parameter is a Manager object that also is required.

The effective parameter is a date parameter that is not required. However, if the caller does not specify a value for this parameter, the current system date is used by default.

A multi-valued parameter is a set, or collection, of values. Such a parameter is useful when the operation must operate on several objects even though it is invoked in the context of a single object. An operation optionally can return an object when it completes processing, just as a program function can return a value. An operation that returns an object is called typed because it has a return type specified. An operation that does not return an object is called un-typed because it does not have a return type specified. A return type must be one of the types recognized by the repository. An operation can return a set of objects by specifying a collection as its return type.

An operation can be defined for a type and then redefined for each subtype of the original type. This process is called overriding an operation.

When an operation is overridden, a subtype that inherits the operation has a separate method that redefines the functionality of that operation. The technique that the repository uses to choose which method to call for a given operation is called dynamic binding.

Dynamic binding (also called polymorphism) means that the repository chooses the method that is most specific for a given object and operation. The most specific method is the one defined in the lowest subtype of which the object is an instance.

For example, assume setSalary is an operation defined for the Employee type. An employee object can be an instance of the Employee type or one of its subtypes.

If you call the setSalary operation for an object that is an Employee instance, the repository selects the method associated with the setSalary operation defined for the employee type.

If you call the setSalary operation for an object that is a Manager instance, the repository selects the method associated with the setSalary operation as it is redefined for the Manager type. If the Manager type does not redefine the setSalary operation, the repository selects the method associated with the setSalary operation defined for the Employee type as the immediate supertype of the Manager type.

You can define an operation to be called with different sets of parameters. For example, you might define the setSalary operation to be called with only an amount parameter or with both an amount parameter and an effectiveDate parameter.

Each combination of parameters that an operation can accept is called a signature. To define multiple signatures for an operation, you define the operation more than once in the same owner type and use the desired signature for each definition.

Methods

The operations defined for a model form an interface that can be seen by a caller. Separate from this definition, each operation must be implemented by a module of code called a method. Methods are typically written as separate functions and bound into a set of code libraries. The method code library name for each operation is then identified to the repository as part of the definition of the operation.

When a caller invokes an operation, the request is received by the repository, which finds and calls the appropriate method. The operation passes to the method the appropriate parameters. When a method is called, it can then act as a caller and call back into the repository to invoke other operations. Consequently, a method can be thought of as a specialized kind of application program.

Objects

An object is an abstract representation of a real-world concept or thing-such as a person, a software package, or an event-that is stored in the repository. In the repository, the state of an object is represented by the values of the properties defined for the type. For example, the state of an integer is its numeric value. The state of a person is its name, birthDate, spouse and so on.

The behavior of an object is the set of functions that the object can perform. In the repository, the behavior of an object is represented by the operations defined for the owner type. A characteristic of object behavior is the ability to return some of its state to a requester. For example, the object person can return its name. For this reason, some object models describe object behavior as the set of messages that an object can receive and respond to. One example of object behavior is the capability an integer has to perform such functions as addition, square root and absolute value.

Component Object is a versioned object (i.e., a particular historical state of an object) that is part of a composite object. The relationship of the component object to the composite object is defined by a composition relationship. A component object can itself be a composite object. In this case, the component object contains other component objects related to it by composition relationships. A component object can belong to several composite objects. This feature promotes sharing of objects in the repository.

A Composite Context is a type that defines the scope of a composite hierarchy. The composite context identifies the top object for the hierarchy and the ghost objects that were created while the context was the current composite context. The term ghost as used herein means a value associated with a changeable object. Objects with ghost status can only be viewed in certain situations, i.e. they are only visible in the context in which they were created.

A Composite Hierarchy is a tree structure composed of a composite object and its component objects. The hierarchy also includes the component objects for any component object that is itself a composite object. Thus, this structure defines the component objects of the top, or root object, the components of those components, and so on to the bottom of the hierarchy.

A Composite Object is a versioned object for which at least one composite relationship is defined thus allowing the object to have components. A composite object can be thought of as owning its component objects. Some examples of these are: a car engine-the component objects include spark plugs, wires and pistons; a program-the component objects include files, record layouts and modules; a menu-the component objects are the various selections on the menu.

A Composite Reference is the relationship that links a composite object to its component objects. The relationship between a car engine and its parts-spark plugs, pistons, wires and so on can be used to illustrate a composite relationship. The car engine and its components can be treated as a single object, yet each of the parts can be accessed individually.

The term Visibility is used with versioned objects whose reserveStatus value is ghost. A ghost object is visible only in the composite context in which it was created. When this composite context is the current object, one can change the attributes of the ghost object, add or remove an object from the attributes of another object and so on.

A composite object usually represents a structure such as a program or a system. However, the method of the present invention does not enforce a presentation methodology. Therefore, the user can define the composition relationship needed for a tool model and create the user interface best suited to displaying the composite objects to the tool user. The composite object service automatically creates a default composite context when the user begins a session with the repository. Thus, the tool does not need to create a composite context unless it requires one.

The user can create a composite or component object as one would any other versioned object. To identify the top, or root, object in a composite hierarchy, the user designates that object as the top property value for the composite context. Once the user has designated a top object, reserving an object in the composite hierarchy causes all composite objects in the hierarchy that contain the reserved object to also be reserved. Any composites that contain these objects are also reserved, up to and including the top object. This process creates a new composite hierarchy that contains all the changed objects.

The composite object service 22d enables the user to add and remove component objects by changing the property that defines the composition relationship for the composite object type. Because invoking the add and remove operations changes the composite object, the user must first reserve the object before inserting or removing a component.

Invoking an operation for a composite object might also invoke the same operation for the component objects. For example, the following operations can impact component objects:

The reserve operation enables the user to reserve the component objects as well as the composite object;

The replace operation replaces all versioned objects related to the composite object by either a composite or reference relationship; and, The unreserve operation unreserves the composite object. If the composite object was reserved with its component objects, the operation also unreserves the components.

In adding and removing versions of an object, the user can use an update relationship operation defined for the repository versioned object type to:

Add new versions of a component object to a composite object; and,

Remove old versions of a component object from a composite object.

Figure 2:
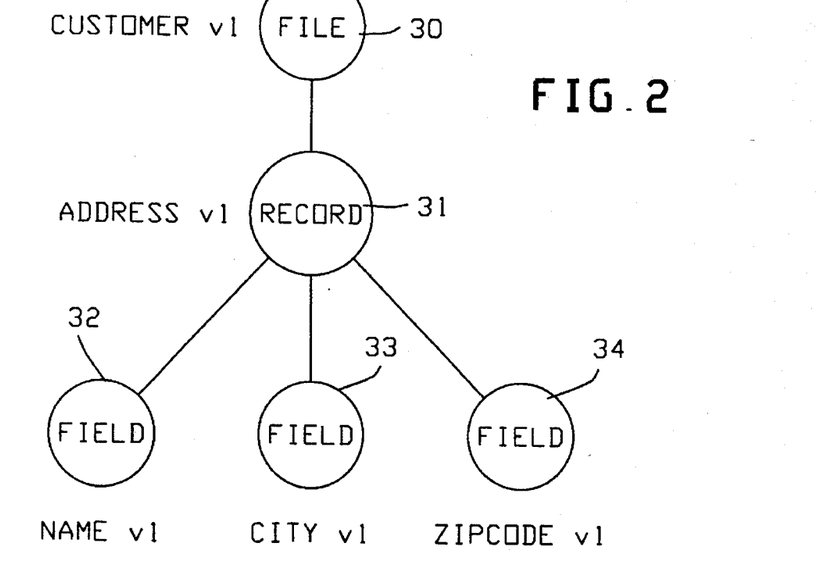
FIG. 2 is a basic composite hierarchy diagram.
Figure 3:
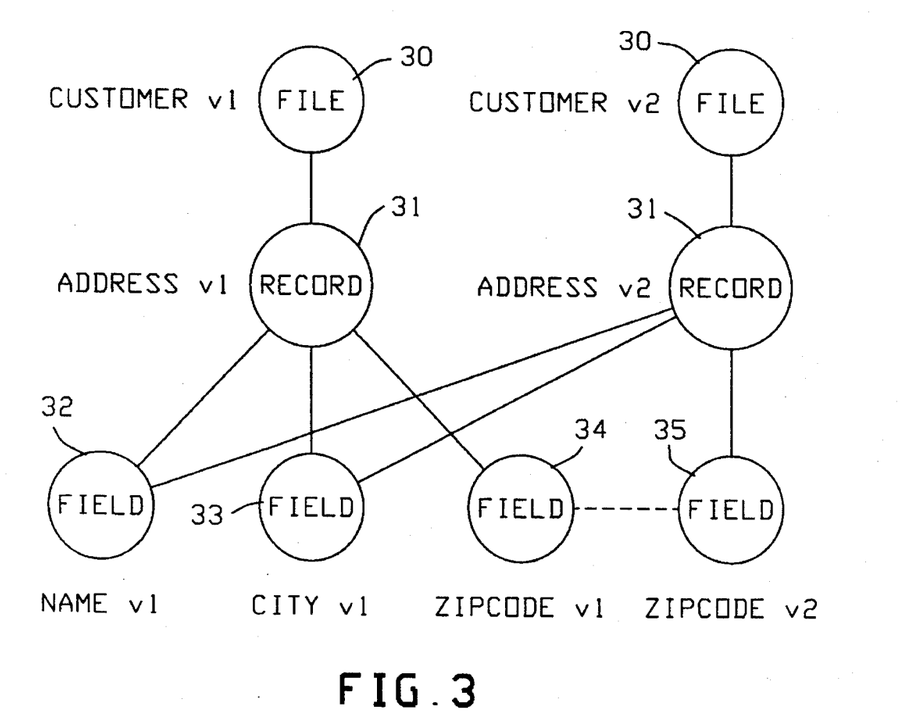
FIG. 3 is the composite hierarchy diagram of FIG. 2 following a reserve operation.

Two examples of a composite object are shown in FIGS. 2 and 3, wherein the example of FIG. 2 shows a simple composite hierarchy having a File object 30, a Record object 31 and three Field objects 32, 33 and 34. The scenario is as follows: the File object 30 has an attribute that defines a composition relationship allowing the File object 30 to contain records. The Record object 31 has an attribute that defines a composition relationship allowing the Record object to contain fields (such as field objects 32, 33 and 34). The Top attribute value in the user's current context is the object with the name Customer and the versionNumber attribute equal to 1. The File object 30 is referred to herein as the top object of the hierarchy.

If the user wants to change an attribute of ZipCode, then the Field object 34 must be reserved. The resulting composite hierarchy with the newly created versions is shown in FIG. 3 Version 2 of Customer, Address and ZipCode are now created since Version I was reserved. For each of these objects, the reserveStatus attribute value is ghost. New versions of Name and City are not created; instead new composition relationships are created between these objects and version 2 of Address.

Figures 4, 6:
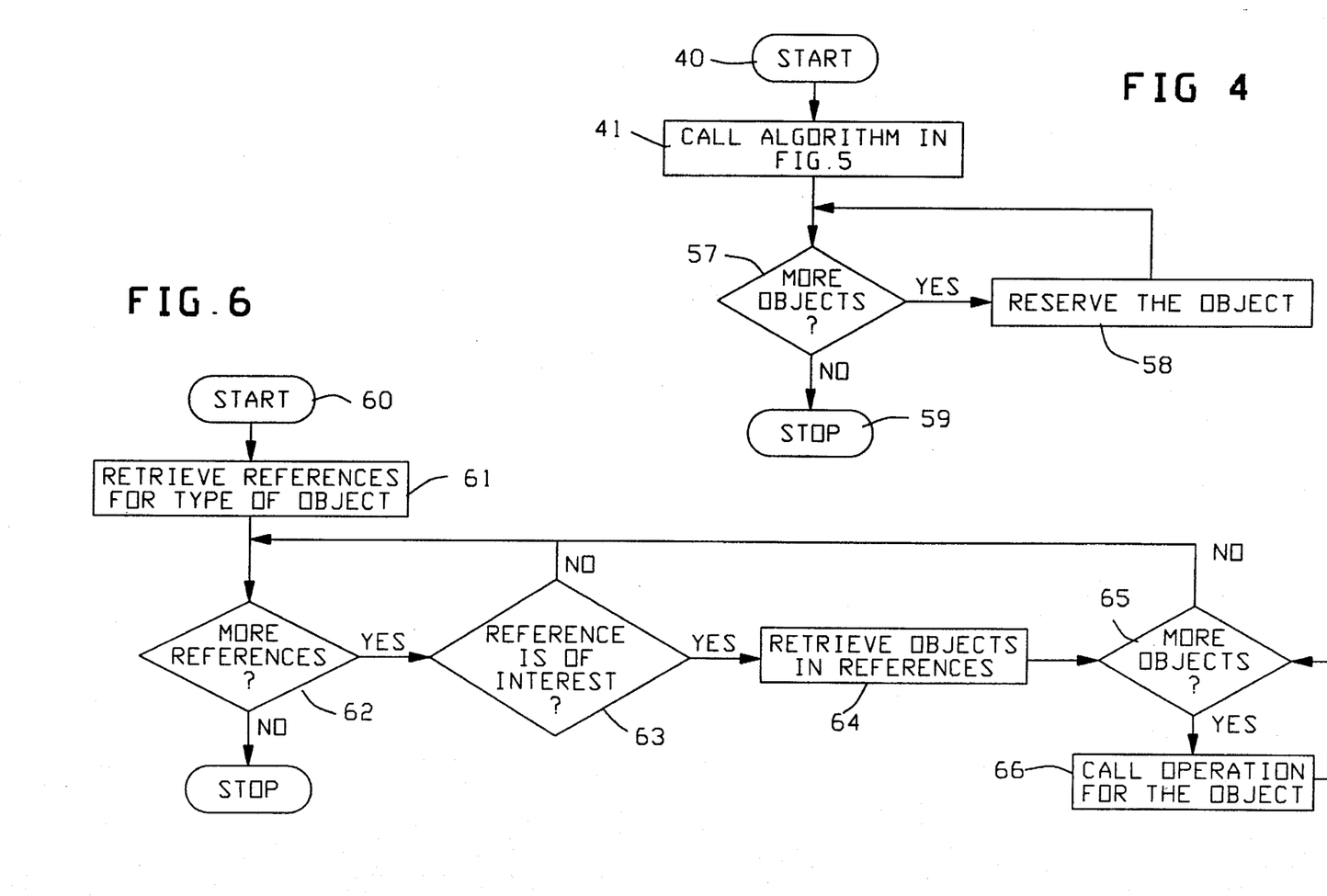
FIGS. 4 and 5 are flow charts illustrating the steps performed in carrying out the change from the composite hierarchy of FIG. 2 to that of FIG. 3.
FIG. 6 is a flow chart illustrating the steps performed in treating a group of objects as a single object.
Figure 5:
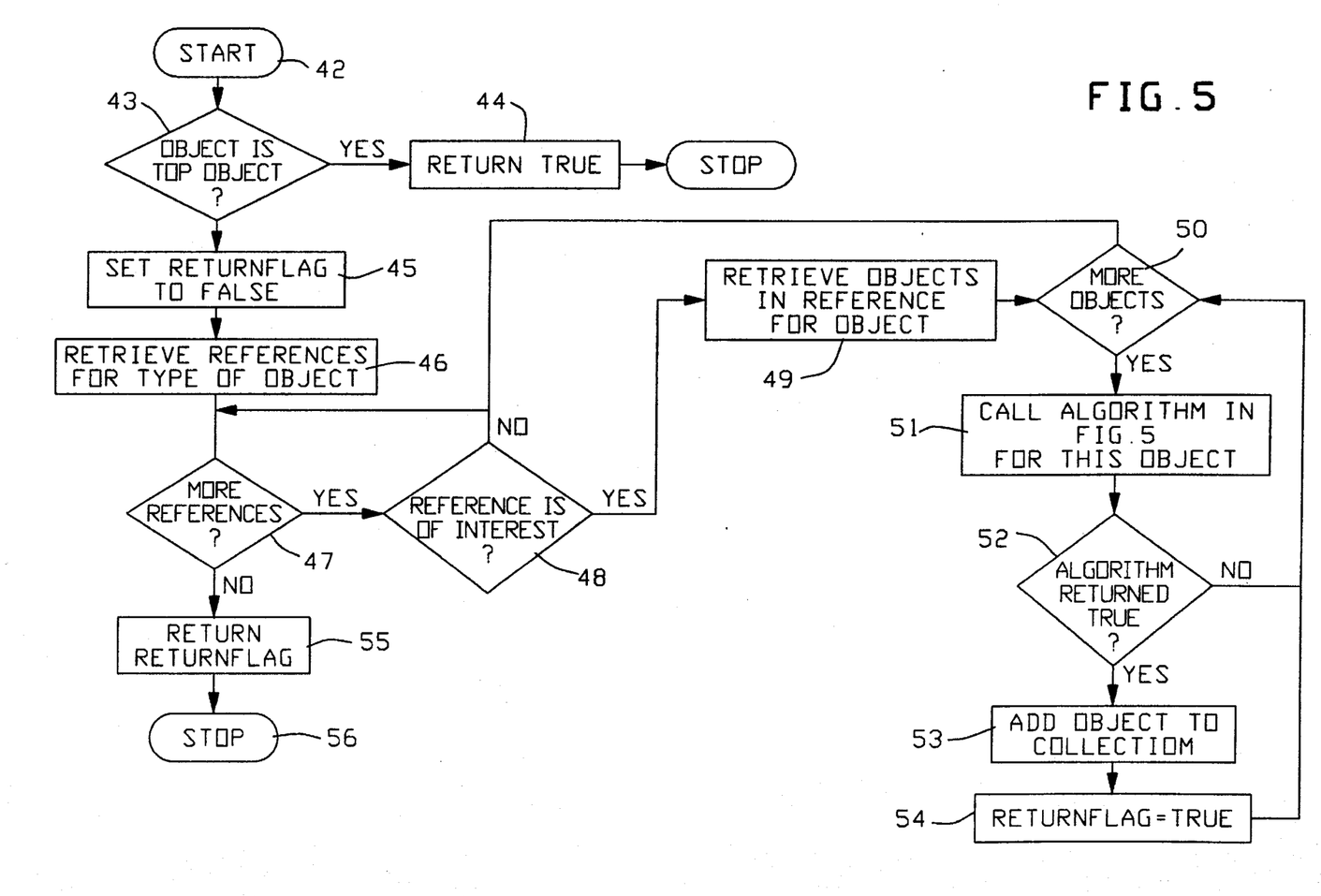

With reference to FIGS. 4 and 5, the process to perform the operation of changing the FIG. 2 hierarchy to that shown in FIG. 3 is illustrated. (The pseudo code for the flow chart shown in FIG. 4 is listed in Appendix A hereof and that for FIG. 5 is shown in Appendix B hereof) From a START bubble 40, the process shown in FIG. 5 is called up, as depicted by a process block 41. From a START bubble 42 in FIG. 5, an inquiry is made as to whether or not the current object is the top object (decision diamond 43). An example of a "top object" is File 30 in FIG. 2. If the response to this inquiry is YES, then the return is TRUE, which means the top object has been found and the search is ended. The return TRUE operation is depicted by a process block 44. On the other hand if the answer to this inquiry is NO, then the returnFlag is set to FALSE as depicted by a process block 45. Setting the return flag is an initialization of a variable used to hold the return value. Following this step references for the type are retrieved as depicted by a process block 46.

An inquiry is next made as to whether or not there are more references in the list returned by the step represented by the process block 46. This inquiry is depicted by a decision diamond 47. If the answer to this inquiry is YES, then a branch is taken to yet another decision diamond 48, where an inquiry is made as to whether or not the reference is of interest. A reference is of interest if its inverse is a composite reference. In other words, we are trying to find a path to the top object (see e.g. the path from object 34 to object 30 in FIG. 3), and keep track of the objects found in the path. If the reference is not of interest then a return is made back to the decision diamond 47 for the next reference. On the other hand, if the reference is of interest, then a branch is taken to a process block 49 where objects are retrieved for the current object and reference. Once this process step is complete an inquiry is made as to whether or not more objects are in the collection returned in the step represented by the process block 49. This inquiry is represented by a decision diamond 50.

If there are no more objects in the collection, then a return is made back to the input of decision diamond 46 for the next reference in the list. However, if there are more objects in Reference (YES branch of decision diamond 50), then this process (FIG.5 flow chart) is called for the object, as depicted by a process block 51. Following this step, an inquiry is made as to whether or not the return value (from the step depicted by the process block 51) is TRUE, decision diamond 52. If the process did not return TRUE, then a branch is made back to the decision diamond 50. However, if the process did return TRUE, then a branch is taken to a process block 53 to add this object to the collection and set the returnFlag to TRUE, process block 54. After this step, a return is made back to the decision diamond 50 to repeat the process for the next object in the collection, if any.

Once all the references in the list have been processed, a branch is taken from the NO leg of the decision diamond 48 to return returnFlag and the collection of objects found as illustrated by a process block 55. Following this an exit is made as represented by the END bubble 56. At this juncture a return is made to the process shown in FIG. 4 wherein an inquiry is made as to whether or not there are more objects to process in the collection returned in the step depicted by the process block 55. This inquiry is depicted by a decision diamond 55. If the answer is YES, then a branch is taken to a process block 58 to reserve the object. Following this reserve step, a return is made to the decision diamond 57. On the other hand, if there are no more objects, then a branch is taken out the NO leg of the decision diamond 57 to exit this process, END bubble 59. Note that only one pass is made through the flow chart shown in FIG. 4, while multiple passes are made through the flow chart shown in FIG. 5, i.e., one pass for each object at the process block 51.

Referring now to FIG. 6, a flow chart illustrates the method for treating objects as groups of objects. From a start bubble 60 the references for type are retrieved, process block 61. As a result of this process step a collection of References are returned. An inquiry is next made as to whether or not there are more References on the list retrieved in the preceding step, as depicted by a decision diamond 62. If the answer to this inquiry is YES, then another inquiry is made as to whether or not this reference is of interest, i.e. a composite reference, decision diamond 63. If it is a composite reference then the YES branch is taken from the diamond 63. On the other hand if the reference is not of interest, then the NO branch is taken from the diamond 63 back to the input of the diamond 62 for the next reference.

If the reference is of interest, then an exit is taken from the YES leg of the diamond 63 to a process block 64, wherein the objects in reference are retrieved. Next, an inquiry is made as to whether or not there are more objects in the list, decision diamond 65. If there are more objects, then an exit is taken on the YES branch to call the current operation for the object, as depicted by a process block 66. The current operation is called for the retrieved object. If there are no more objects then the NO exit is taken back to the decision diamond 62 for the next reference on the list.

Figure 7:
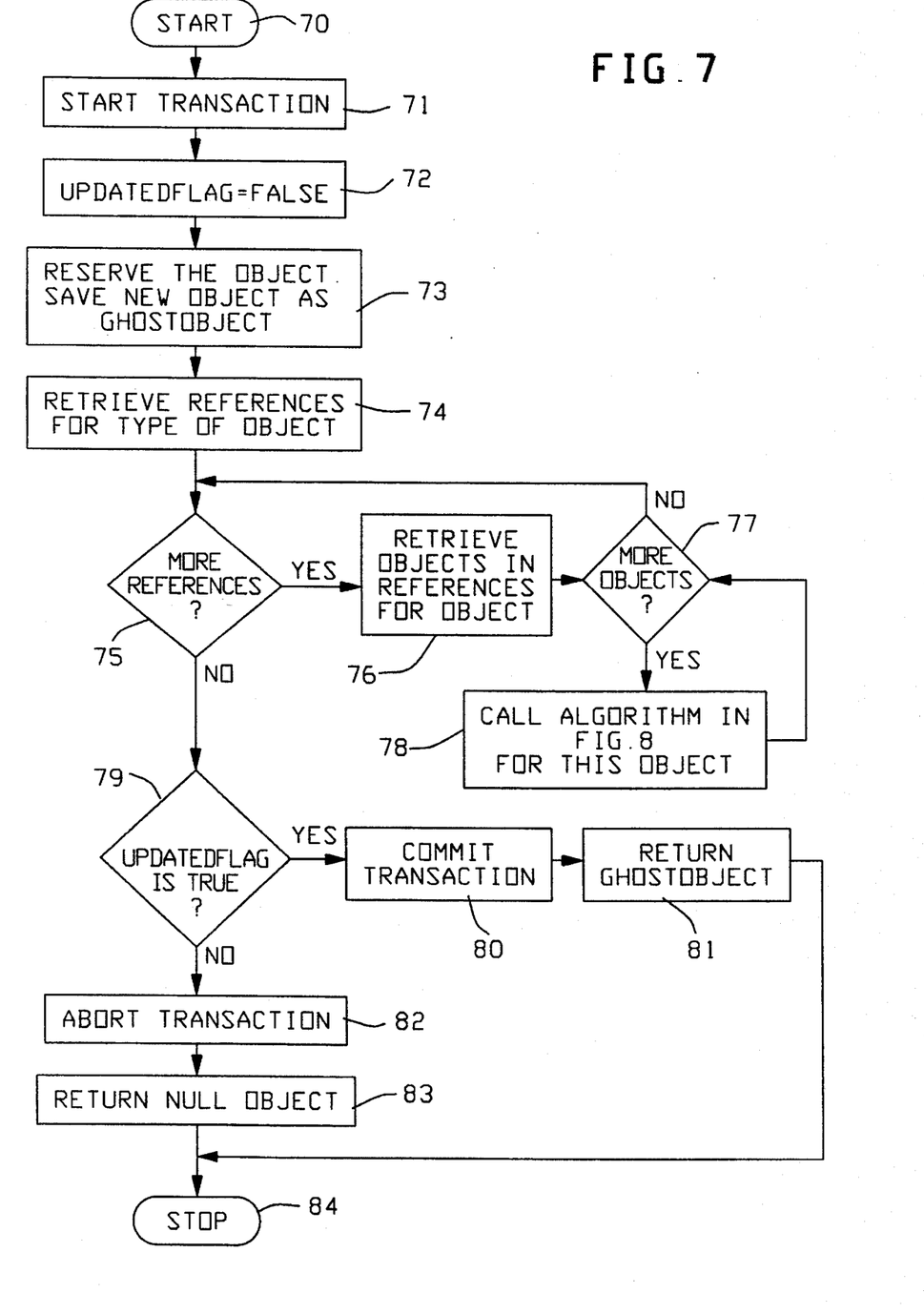
FIGS. 7 and 8 are flow charts illustrating the steps performed in updating objects or combinations thereof.

Referring now to FIG. 7, a flowchart is shown of the steps performed in updating references. The process begins with a start bubble 70, followed by the start of a database transaction, as depicted by a process block 71. Next a boolean flag, updated, is set to FALSE as depicted by a process block 72. This flag is used to hold a value for processing at the end of the process. Following this, the object is reserved (block 73). The new object returned from the reserve is called ghostObject. The next step is to retrieve the references for the object's type, as represented by a process block 74. Each reference is then retrieved from the collection, and an inquiry is made (decision diamond 75) as to whether or not there are more references in the collection.

The next step in this process is to retrieve the objects contained in the reference (process block 76), and a collection of objects is returned. Each object is retrieved from the collection. An inquiry is made as to whether or not there are more objects in the collection, as depicted by a decision diamond 77. For each object retrieved from the collection a process shown in FIG. 8 and described hereinafter is performed (process block 78). Once all references have been processed, the NO exit is taken from the decision diamond 75 to another inquiry as to whether or not the Updated Flag is TRUE, decision diamond 79. If the updated Flag is TRUE, then a later version for one of the objects was found. The work performed by the process must be saved, which is represented by a process block labeled Commit Transaction 80. Following this, GhostObject is returned (process block 81), which was created in the process step represented by block 73. If the updated Flag is FALSE (NO leg exit from diamond 79), the transaction is aborted and no changes are saved into the database (process block 82). Next, a null object is returned to the caller (process block 83), following which the process is terminated (bubble 84).

Figure 8:
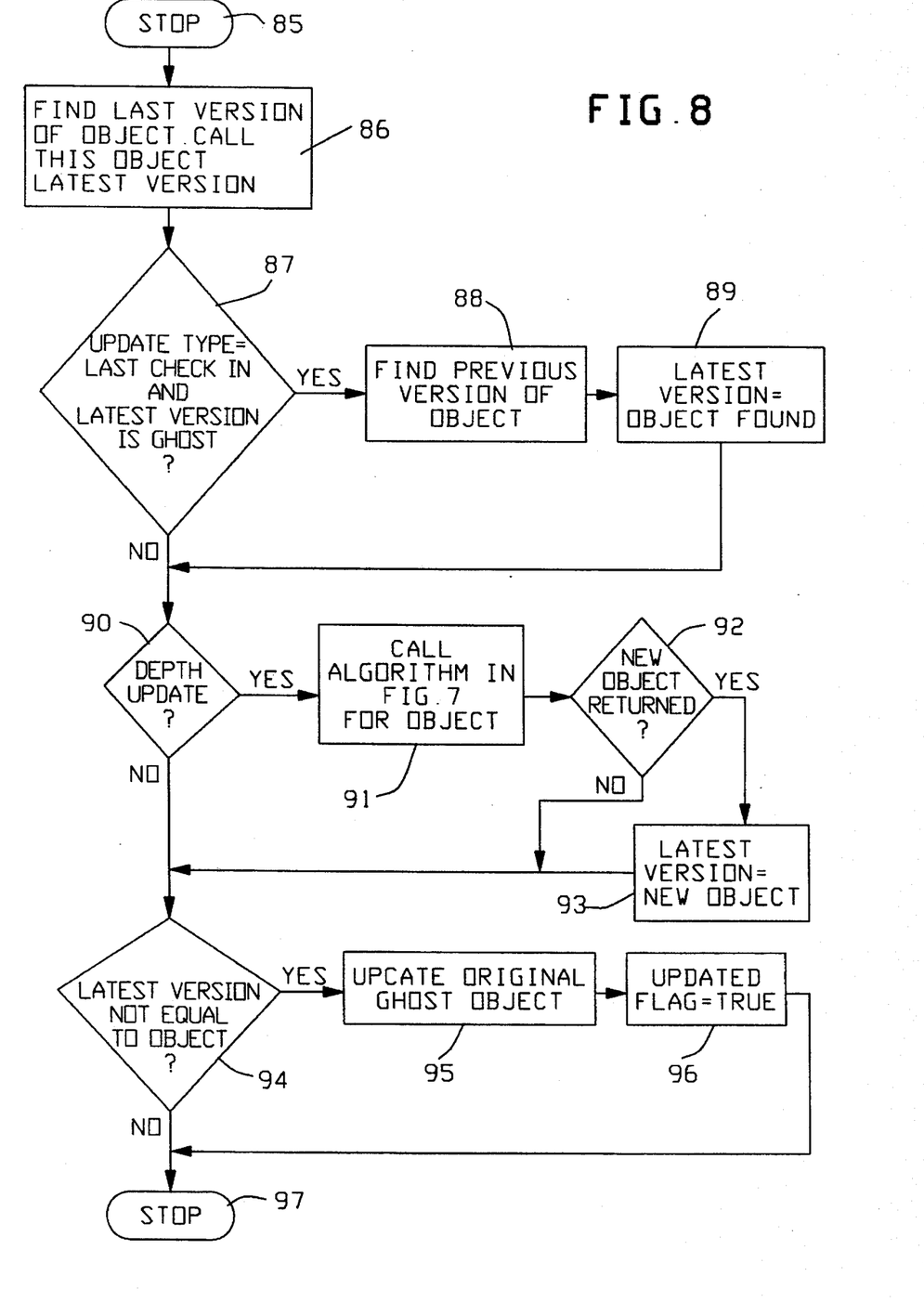

Referring now to FIG. 8, the balance of the flow chart of FIG. 7 is shown. Recall in the description above that each object retrieved as a result of the process step depicted by the process block 76 is further processed as referenced by the process block 78. We begin with a start bubble 85. Next, the latest version of object is found, which object is called latestVersion i.e., the latest version of the object on the same variant is found. The same object could be "found"; indicating there is no later version on that variant. A local variable, latestVersion, holds this object for later processing.

This process step is depicted by a process block 86. One of the parameters to updateReferences (current process) defines the desired visibility of the latest versions found. If the parameter's value is lastCheckedIn, we cannot use a ghost object. This process step is represented by a decision diamond 87, which inquiry is: UpdateType=LastCheckedIn and LatestVersion is ghost. If the answer is TRUE or YES, then the process directs the finding of the previous version of the object on the same variant, process block 88. This object is then stored in the local variable, LatestVersion, for later processing. This process step is depicted by a block 89, entitled LatestVersion=object found. After the process step depicted by process block 89 has been performed a return is made to the decision diamond 90.

If the answer to the inquiry depicted by decision diamond 87 is NO, then another inquiry is made as to whether or not the objects in the references are updated themselves as represented by a decision diamond 90 labeled Depth Update? One of the parameters to updateReferences, depthUpdate, specifies whether the objects in the references are updated themselves (i.e., recursively). If the process is recursive, YES branch from the diamond 90, then the updateReferences is called for latestVersion. This process step is represented by a process block 91. The updateReferences process can return a new object or a null object. Hence, an inquiry is made as to whether the object returned is not the same as latestVersion, decision diamond 92. If the answer to this inquiry is yes, then the LatestVersion is set equal to the new object (process block 93). Following this step a return is made back to the input of the decision diamond 94.

If the process is not recursive, then the NO branch is taken from the decision diamond 90. Next, the object in the latestVersion variable is compared with the object with which entry was made from the process block 78 in FIG. 7. This process step is represented by a decision diamond 94. If the two objects are not the same, then the ghostObject is updated by removing the object found in the process block 78 (FIG. 7) from the relationship and inserting the latestVersion object. This process step is depicted by a process block 95 labeled update original ghostObject. Following this step, the updated flag is set to TRUE, which is depicted by a process block 96. Next, this process is stopped (bubble 97). Also, if the comparison performed above (decision diamond 94) is FALSE the process is stopped.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

APPENDICES:

Appendix A, Pseudo Code for the FIG. 4 Flow Chart:

After the composite object has been reserved the following steps are performed if the reserveComposites parameter is TRUE:

1. Call getAllComposites.
2. For each object in the returned array, call reserve with reserveComponent=FALSE and reserveComposites=FALSE. (This ensures we don't get all composites for these objects again).

Appendix B, Pseudo Code for the FIG. 5 Flow Chart:

The findCompositeToTop operation performs the following steps:

1. If "this"==top Return TRUE
2. Declare a boolean, returnValue, initial value is FALSE.
3. Get the type of the object (getByName of UrepMetaType).*
4. Call getAllFeatures for the type, with the parameter of references.
5. For each reference in the returned collection:
   a Retrieve the UREPMetaReference instance that is the inverse.
   If the composite attribute of the UREPMetaReference is TRUE then:
      i. Get the objects in the reference attribute for "this" (getProperty).

* Note: Urep is an acronym for Unisys Repository, wherein Unisys Corporation is the assignee of this patent application.

ii. For each object in the returned collection: If the object is not a member of compositescall findCompositeToTop for the object. If findComopositeToTop returns TRUE: Set return value =TRUE If the reserveStatus value for the object is not ghost, add the object to composites.
6. Return return Value.

Appendix C, Pseudo Code for the FIG. 6 Flow Chart:

The getAllComponents operation performs the following steps:

1. Create an instance of an array of UrepVersionedObject called components.
2. Get the type of the object (class attribute of the object).
3. Call getAllFeatures for the type, with the parameter of references.
4. For each instance in the returned collection: If the composite attribute of the UrepMetaReference is TRUE Retrieve the objects in the attribute for this object (getProperty) and add it to components.

5. Return components.

Appendix D, Pseudo Code for FIGS. 7 and 8 Flow Charts:

The updateReferences operation only returns a new object when one of the objects in its composite or reference is updated because a later version on the same variant was found. This creates new objects only when needed and preserves the reference to objects that have no later versions. The operation performs the following steps:

1. A short transaction is started.
2. Declare a boolean flag, updated, initial value is FALSE.
3. The object is reserved (using the variant parameter), with reserveComponent=FALSE. Call this object ghostObject.
4. Get the type of the object (getByName of UrepMetaType).
5. Get the relationships for this type by calling getAllFeatures with featureType=references.
6. For each reference where the reference is composite.

a. Retrieve the objects in that reference attribute.
   b. For each object in the returned collection (call this object referencedObject) do the following:
      i. Find the last checked in or latest version, depending on updateType, on the variant of referencedObject. Call findVersion with Version=0 and variant=the variant of this object. Call this (possibly) new object latestVersion.

If updateType=lastCheckedIn and reserveStatus of latestVersion is ghost, then get the previousVersion of latestVersion, on the same variant.
      ii. If depthUpdate is TRUE, call updateReference for latestVersion. If a new object is returned from this call, set latestVersion to this new object.
      iii. If latestVersion is not the same object as referencedObject (i.e. we found a later version), remove referencedObject from the attribute on ghostObject, and add latestVersion to the attribute on ghostObject. Set updated flag to TRUE.
7. If updated flag is TRUE, commit the transaction, and return ghostObject to the caller. Otherwise abort the transaction and return to NULL.

What is claimed is:

1. In a computer system having a user interface, a memory and a database, a repository program operating in said computer system for accessing said database, said repository program executing a method for updating each object in a reference to latest version of said object, said method comprising the steps of:

a. starting a database transaction;
   b. setting a boolean flag, updatedFlag to false;
   c. reserving said object and saving a new object as ghostObject;
   d. retrieving a collection of references for type of said object;
   e. retrieving objects in each reference found in step d hereof;
   f. finding latest version of each object retrieved in step e hereof on same variant and storing said retrieved object as latestVersion;
   g. finding previous version of latestVersion if updateType is lastChecked in and latestVersion is a ghostObject and assigning object found to latestVersion;
   h. performing the steps of this method for said latestVersion if depth update was specified;
   i. setting value of latestVersion to object returned in step h hereof if an object was returned;
   j. comparing latestVersion to object and updating ghotstObject with latestVersion and setting updatedFlag to true if they are not the same object;
   k. committing said database transaction if updatedFlag is true and returning ghostObject; and,
   l. aborting said database transaction if updatedFlag is false and return a null object.

2. The method as in claim 1 for each object found in steps f and g, performing all steps in claim 5 so as to define a new composite object hierarchy containing the latest version of those objects.

3. In a computer system having a user interface, a memory and a database, a repository program operation in said computer system for accessing said database, said repository program executing a method for creating a changeable hierarchy of objects comprising the steps of:

a. reserving a versioned object;
b. retrieving a collection of objects that form a path between said version object and a top object in said hierarchy comprising the steps of:
   1) comparing said versioned object against said top object and returning true if both objects are the same;
   2) setting a boolean flag, returnValue, to false;
   3) retrieving a collection of references for type of said object;
   4) examining each reference in said collection of references retrieved in the preceding step hereof and selecting those references whose inverse is a composite reference;
   5) retrieving objects found in each of said references selected in the preceding step hereof;
   6) performing steps of this method for each object retrieved in step 5) hereof;
   7) adding said object to a collection of objects in true was returned in step 6) hereof;
   8) setting returnFlag to true if true was returned in step 6) hereof;
   9) returning returnFlag and collection of objects.

4. The method as in claim 3 further including the step of setting a top object as a limit on said method.

* * * * *